United States Patent Office 3,582,344
Patented June 1, 1971

3,582,344
SILVER HALIDE EMULSIONS CONTAINING RED TO INFRARED SENSITIZING POLYMETHINE DYES
Donald W. Heseltine and John D. Mee, Rochester, N.Y., assignors to Eastman Kodak Company, Rochester, N.Y.
No Drawing. Filed Nov. 12, 1968, Ser. No. 775,135
Int. Cl. G03c 1/10
U.S. Cl. 96—106                                 9 Claims

ABSTRACT OF THE DISCLOSURE

Novel polymethine dyes are provided in which two heterocyclic nuclei of the type used in cyanine dyes are joined by the following:

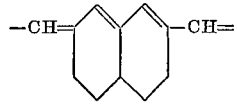

The polymethine dyes of this invention are useful spectral sensitizers for photographic silver halide emulsions.

This invention relates to novel photographic materials, and more particularly to a new class of polymethine sensitizing dyes, to new photographic silver halide emulsions and elements prepared therewith, and to the preparation of these novel materials.

Polymethine sensitizing dyes having three consecutive carbon atoms of the conjugated methine chain included in a carbocyclic ring have been previously described, for example, in Kendall, British Pats. Nos. 595,784 and 595,785. While such prior art dyes have been found to be useful in a number of photographic materials, they have not proven entirely satisfactory for some applications, for example, where highly selective spectral sensitization is desirable in the red to infrared region of the spectrum. It is apparent, therefore, that there is need in the art for photographic materials having improved sensitivity to longer wavelength radiations.

It is, accordingly, an object of this invention to provide a new class of polymethine dyes.

Another object of this invention is to provide novel light sensitive photographic silver halide emulsions containing one or more of the new dyes of the invention and photographic elements prepared therewith.

Still another object of this invention is to provide means for preparing the new class of dyes and novel photographic materials of the invention.

Another object of this invention is to provide polymethine dyes having good light stability and good keeping properties.

Other objects of this invention will be evident from this disclosure and the appended claims.

We have now found that polymethine dyes in which five consecutive carbon atoms of the conjugated methine chain are included in a rigid carbocyclic system are outstanding spectral sensitizers for light sensitive photographic silver halide emulsions, extending the sensitivity of such emulsions to radiations in the red to infrared region of the spectrum, i.e., about from 675 to 875 nm., with maximum sensitivity ranging from about 770 to 800 nm. The images produced with the novel sensitized emulsions of this invention are clear and sharp, and of excellent contrast. The dyes of this invention have excellent keeping properties and exhibit good light stability.

The new class of polymethine dyes of the invention are in the form of their quaternary salts and include those comprising first and second 5- to 6-membered nitrogen containing heterocyclic nuclei of the type usd in cyanine dyes joined together at a carbon atom thereof by a linkage having the structure

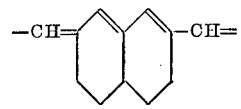

to complete said polymethine dye.

The preferred class of novel polymethine dyes of the invention include those defined by the following formula:

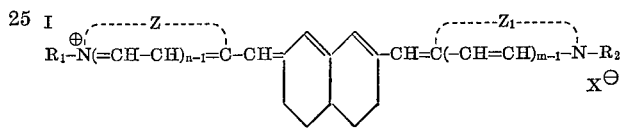

wherein $n$ and $m$ each represents a positive integer of from 1 to 2; $R_1$ and $R_2$ each represents an alkyl group, including substituted alkyl, (preferably a lower alkyl containing from 1 to 4 carbon atoms), e.g., methyl, ethyl, propyl, isopropyl, butyl, hexyl, cyclohexyl, decyl, dodecyl, etc., a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc., a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, benzyl, phenethyl, etc., X represents an acid anion, e.g., chloride, bromide, iodide, thiocyanate, sulfamate, perchlorate, p-toluenesulfonate, methylsulfate, etc.; Z and $Z_1$ each represents the non-metallic atoms necessary to complete the same or different 5- to 6-membered heterocyclic nucleus such as those used in cyanine dyes, which nucleus may contain a second hetero atom such as oxygen, sulfur, selenium or nitrogen such as the following nuclei: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1 - d]thiazole, naphtho[1,2 - d]thiazole, 5-methoxynaphtho[2,3 - d]thiazole, 5-ethoxynaptho[2,3 - d]thiazole, 8-methoxynaphtho[2,3 - d]thiazole, 7 - methoxynaphtho[2,3 - d]thiazole, 4'-methoxythianaphtheno - 7',6' - 4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5 - ethoxybenzoxazole, 5-chlorobenzoxazole, 6-methoxybenzoxazole, 5-hydroxybenzoxazole, 6-hydroxybenzoxazole, naphtho[2,1-d]oxazole, naphtho[1,2-d]-oxazole, etc.; a selenazole nucleus, e.g., 4-methylselenazole, 4-phenylselenazole, benzoselenazole, 5-chlorobenzoselenazole, 5 - methoxy benzoselenazole, 5-hydroxybenzoselenazole, tetrahydrobenzoselenazole, naphtho[2,1-d]selenazole, naphtho[1,2-d]selenazole, etc.; a thiazoline nucleus, e.g., thiazoline, 4-methylthiazoline, etc.; a pyridine nucleus, e.g., 2-pyridine, 5-methyl-2-pyridine, 4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, 1-isoquinoline, 3,4-dihydro-1-isoquinoline, 3-isoquinoline, etc.; a 3,3-dialkylindolenine nucleus, e.g., 3,3-dimethylindolenine, 3,3,5-trimethylindolenine, etc.; and, an imidazole nucleus, e.g., imidazole, 1-alkylimidazole, 1-alkyl-4-phenylimidazole, 1-alkyl-4,5-dimethylimidazole, benzimidazole, 1-alkylbenzimidazole, 1-aryl-5,6-dichlorobenzimidazole, 1-alkyl-1H-naphth[1,2-d]imidazole, 1-aryl-3H-naphth[1,2-d]imidazole, 1 - alkyl-5-methoxy-1H-naphth-[1,2-d]imidazole, etc.

The above defined polymethine dyes of the invention are conveniently prepared, for example, by reacting (1) a quaternary salt of the following formula:

II
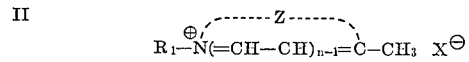

wherein $n$, $R_1$, X and Z are as previously defined, with (2) 7-hydroxy-4,4a,5,6-tetrahydro-2(3H)-naphthalenone, in the proportions of approximately 2 moles of (1) to 1 mole of (2), at a temperature of about from 140 to 210° C., until the reaction is substantially complete. The cooled reaction mixture is dissolved in pyridine with warming, and a solution of sodium iodide in methanol is added. The mixture is then chilled and the solid product collected. The purified dye is obtained by one or more recrystallizations from suitable solvents such as methanol. For preparing the dyes wherein Z and $Z_1$ complete different nuclei, equimolar quantities of component (1) and (2) above are reacted together and the resulting intermediate is then reacted with an appropriate amount of a compound of the formula:

III
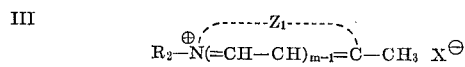

wherein $m$, $R_2$, X and $Z_1$ are as previously defined, following the general procedure described above.

The intermediate 7-hydroxy-4,4a,5,6-tetrahydro-2(3H)-naphthalenone is prepared by Birch reduction of 2,7-dimethoxynaphthalene, followed by acid hydrolysis as described by Radlick (J. Org. Chem., 30, 3028–9 (1965)).

In the preparation of light sensitive silver halide photographic emulsions, the dyes of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the dyes of the invention include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The binding agents for the emulsion layer of the photographic element can also contain dispersed polymerized vinyl compounds. Such compounds are disclosed, for example, in U.S. Pats. 3,142,568, 3,193,386, 3,062,674 and 3,220,844 and include the water insoluble polymers of alkyl acrylates and methacrylates, acrylic acid, sulfoalkyl acrylates or methacrylates and the like.

The types of silver halide emulsions that can be sensitized with the new dyes of this invention include any of the conventional emulsions prepared with light-sensitive silver salts including silver chloride, silver bromide, silver iodide, silver chlorobromide, silver bromoiodide, silver chlorobromoiodide, etc. The concentration of the new dyes in the emulsion can vary widely, e.g., from about 5 to about 100 mg. per liter of flowable emulsion. The specific concentration will vary according to the type of light-sensitive material in the emulsion and the effects desired. The suitable and most economical concentration for a given emulsion will be apparent to those skilled in the art upon making the tests and observations customarily used in the art of emulsion making.

To prepare a gelatin-silver halide emulsion sensitized with one of the dyes of this invention, the following procedure is satisfactory. A quantity of the dye is dissolved in a suitable solvent and a volume of this solution containing from 5 to 100 mg. of dye is slowly added to about one liter of a gelatin-silver halide emulsion. With most of the dyes, about from 5 to 20 mg. of dye per liter of emulsion suffices to produce the maximum sensitizing effect with the ordinary gelatin-silver bromide (including bromoiodide and chlorobromide) emulsion. With fine grain emulsions, which include most of the ordinarily employed gelatin-silver chloride emulsions, somewhat larger concentrations of dye may be necessary to obtain the optimum sensitizing effect. While this procedure has dealt with emulsions comprising gelatin, it will be understood that these remarks apply generally to any emulsions wherein part or all of the gelatin is substituted by another suitable hydrophilic colloid, such as previously mentioned. It will also be understood that the above description is intended to be illustrative and should not be construed as limiting our invention in any sense since it is apparent that the new dyes can be incorporated by other methods in many of the photographic silver halide emulsions and hydrophilic colloid layers customarily employed in the art. For instance, the dyes can be incorporated by bathing a plate or film bearing an emulsion layer in a solution of one of the dyes in an appropriate solvent. Bathing methods, however, are not normally preferred.

The novel photographic silver halide emulsions spectrally sensitized with the dyes of the invention can also contain such addenda as chemical sensitizers, e.g., sulfur sensitizers (e.g., allyl thiocarbamate, thiourea, allylisothiocyanate, cystine, etc.), various gold compounds (e.g., potassium chloroaurate, auric trichloride, etc.) (see Baldsiefen, U.S. Pat. No. 2,540,085, issued Feb. 6, 1951, Damschroder, U.S. Pat. No. 2,597,856, issued May 27, 1952 and Yutzy et al. U.S. Pat. No. 2,597,915, issued May 27, 1952), various palladium compounds such as palladium chloride (Baldsiefen, U.S. Pat. No. 2,540,086, issued Feb. 6, 1951), potassium chloropalladate (Stauffer et al., U.S. Pat. No. 2,598,079, issued May 27, 1952), etc., or mixtures of such sensitizers, antifoggants such as ammonium chloroplatinate (Trivelli et al. U.S. Pat. No. 2,566,245, issued Aug. 28, 1951), ammonium chloroplatinite (Trivelli et al., U.S. Pat. No. 2,566,263, issued Aug. 28, 1951), benzotriazole, nitrobenzimidazole, 5-nitroimidazole, benzidine, mercaptans, etc. (see Mees "The Theory of the Photographic Process," MacMillan Pub., 1942, page 460), or mixtures thereof. The novel photographic silver halide emulsions containing the dyes of the invention can be hardened with any suitable hardener, including aldehyde hardeners such as formaldehyde, and mucochloric acid, aziridine hardeners, hardeners which are derivatives of dioxane, oxypolysaccharides such as oxy starch of oxy plant gums, and the like. The emulsion can also contain additional additives, particularly those known to be beneficial in photographic emulsions, including, for example, lubricating materials, stabilizers, speed increasing materials, absorbing dyes, plasticizers, and the like. Thes novel photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the photographic silver halide emulsion using any suitable technique, e.g., techniques of the type shown in Jelley et al. U.S. Pat. 2,322,027, issued June 15, 1943, Fierke et al. U.S. Pat. 2,801,171, issued July 30, 1957, Fisher U.S. Pats. 1,055,155 and 1,102,028, issued Mar. 4, 1913 and June 30, 1914, respectively, and Wilmanns U.S. Pat. 2,186,849 issued Jan. 9, 1940. They can also be developed using incorporated developers such as polyhydroxybenzenes, aminophenols, 3-pyrazolidones, and the like.

The novel emulsions of this invention may be coated on any suitable photographic support, such as glass, film base such as cellulose acetate, cellulose acetate butyrate, polyesters such as poly(ethylene terephthalate), paper, baryta coated paper, polyolefin coated paper, e.g., polyethylene or polypropylene coated paper, which may be electron bombarded to promote emulsion adhesion, to produce the novel photographic elements of the invention.

The invention is further illustrated by the following examples.

EXAMPLE 1

3 - ethyl - 2 - ξ{7-[(3-ethylbenzothiazolinylidene)methyl]-3,4,4a,5,6,7 - hexahydronaphthalen - 2 - ylidene}methyl{benzothiazolium iodide

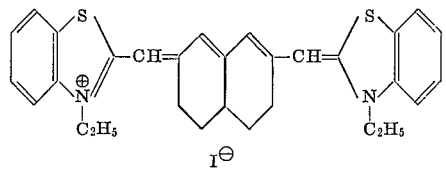

3-ethyl - 2 - methylbenzothiazolium p-toluenesulfonate (1.75 g., 2 mols) and 7-hydroxy-4,4a,5,6-tetrahydro-2(3H)-naphthalenone (0.41 g., 1 mol) are fused together in an oil bath at 200° C. for ½ hour. The cooled reaction mixture is dissolved in pyridine (10 ml.), with warming, and a solution of sodium iodide (1 g.) in methanol (50 ml.) is added. The mixture is chilled and the solid collected. After two recrystallizations from methanol, the yield of purified dye is 0.35 g. (23%), M.P. 233–4° C., (dec.). The dye has good keeping properties and has good light stability.

In place of the 3-ethyl - 2 - methylbenzothiazolium p-toluenesulfonate in the above example, there may be substituted an equivalent amount of, for example, 3-methyl (or propyl, isopropyl, butyl, etc.) -2-methylbenzo- thiazolium p-toluenesulfonate, which can be similarly treated with sodium iodide, sodium bromide, etc., to give the corresponding dye salt having generally similar spectral sensitizing properties for light sensitive silver halide emulsions. Also, the 3-ethyl - 2 - methylbenzothiazolium p-toluenesulfonate can be replaced with an equivalent amount of any other of the intermediates embraced by Formula II, for example, by 3-ethyl-2-methylbenzoxazolium p-toluenesulfonate to give the dye 3-ethyl-2 - ξ{7 - [(3 - ethylbenzoxazolinylidene)methyl]-3,4,4a, 5,6,7 - hexahydronaphthalen - 2 - ylidene}methyl{benzoxazolium iodide; or by 3-ethyl - 2 - methylbenzimidazolium p - toluenesulfonate to give the dye 3 - ethyl - 2 - ξ{7- [(3 - ethylbenzimidazolinylidene)methyl] - 3,4,4a,5,6,7- hexahydronaphthalen - 2 - ylidene}methyl{benzimidazolium iodide; etc. These dyes also have similar spectral sensitizing properties for silver halide emulsions.

EXAMPLE 2

3 - ethyl - 2 - ξ{7 - [(3 - ethylbenzoselenazolinylidene)-methyl]-3,4,4a,5,6,7 - hexahydronaphthalen-2-ylidene}-methyl{benzoselenazolium iodide

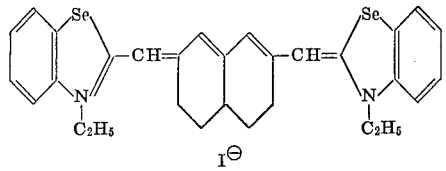

3-ethyl - 2 - methylbenzoselenazolium p-toluenesulfonate (1.92 g., 1 mol) and 7-hydroxy-4,4a,5,6-tetrahydro-2(3H)-naphthalenone (0.82 g., 1 mol) are fused together in an oil bath at 150° C. for 2¼ hours. The cooled reaction mixture is dissolved in pyridine (10 ml.), with warming, and a solution of sodium iodide (1 g.) in methanol (75 ml.) added. The mixture is cooled and the solid collected. After one recrystallization from methanol, the yield of purified dye is 0.23 g. (13%), M.P. 244–5° C., (dec.). The dye exhibits good keeping properties and good light stability.

Related dyes are obtained by replacing the 3-ethyl-2-methylbenzoselenazolium p-toluenesulfonate in the above example with an equivalent amount of other 3-alkyl-2-methylbenzoselenazolium salts, for example, with 3-methyl-2-methylbenzoselenazolium p-toluenesulfonate to give the corresponding dye 3-methyl - 2 - ξ{7-[3-methylbenzoselenazolinylidene)methyl] - 3,4,4a,5,6,7 - hexahydronaphthalen - 2 - ylidene}methyl{benzoselenazolium iodide having similar spectral sensitizing properties for silver halide emulsions.

It will be apparent from the foregoing examples that still other polymethine dyes coming under Formula I above can be readily prepared by the described procedures by suitable selection of intermediates embraced by Formulas II and III above such as the salts of the various 3,3-dialkylindolenines, pyridines, quinolines, thiazoles, naphthothiazoles, oxazoles, naphthoxazoles, selenazoles, naphthoselenazoles, imidazoles, naphthimidazoles, and the like. These dyes likewise are spectral sensitizers for silver halide emulsions.

EXAMPLE 3

The polymethine dyes of the invention as illustrated by above Examples 1 and 2 are photographically tested for spectral sensitizing properties by incorporating the individual dyes, dissolved in each case in a suitable solvent, into separate portions of a silver bromoiodide emulsion containing 2.5 mole percent of iodide, in the concentrations indicated in the following Table 1. After digestion at 40° C. for 10 minutes, the emulsions are coated at a coverage of 100 mg. silver per square foot on a cellulose acetate film support. A sample of each coating is then exposed on an Eastman 1B Sensitometer and to a wedge spectrograph, processed for 6 minutes, at 20° C., in Kodak developer D-19, which has the following composition:

| | G. |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |
| Water to make 1.0 liter. | | and then fixed in a conventional fixing bath, washed and dried. Densitometric measurements are then made of the developed images of each coating. The following table lists the sensitizing ranges and the maximum sensitivities of the tested dyes.

TABLE 1

| Dye of Ex. No. | Conc. of dye (g./ mole silver) | Sensitization range (nm.) | Sensitization maximum (nm.) |
|---|---|---|---|
| Control | 0.0 | <550 | <500 |
| 1 | .025 | 700-850 | 780 |
| 2 | .025 | 700-860 | 790 |

It will be seen from the above table that the dyes of the invention spectrally sensitize light sensitive silver halide emulsions deep into the infrared region of the spectrum and that the maximum sensitivity also occurs well within this region.

The invention has been described in detail with particular reference to preferred embodiments thereof, but, it will be understood that variations and modifications can be effected within the spirit and scope of the invention as described hereinabove and as defined in the appended claims.

We claim:
1. A photographic silver halide emulsion containing a quaternary salt of a polymethine dye selected from those comprising first and second 5- to 6-membered nitrogen containing heterocyclic nuclei of the type used in cyanine dyes joined together at a carbon atom thereof by a linkage having the structure

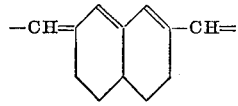

to complete said dye.

2. A silver halide emulsion in accordance with claim 1 wherein said nuclei of said dye are thiazole nuclei.

3. A silver halide emulsion in accordance with claim 1 wherein said nuclei of said dye are selenazole nuclei.

4. A photographic silver halide emulsion containing a polymethine dye represented by the following formula:

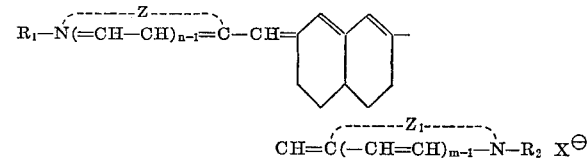

wherein $n$ and $m$ each represents a positive integer of from 1 to 2; $R_1$ and $R_2$ each represents an alkyl group; X represents an acid anion; and Z and $Z_1$ each represents the nonmetallic atoms necessary to complete a heterocyclic nucleus of the type used in cyanine dyes having from 5 to 6 atoms in the heterocyclic ring.

5. A photographic emulsion in accordance with claim 4 wherein said Z and said $Z_1$ of the polymethine dye each represents the atoms to complete a benzothiazole nucleus.

6. A photographic emulsion in accordance with claim 4 wherein said Z and said $Z_1$ of the polymethine dye each represents the atoms to complete a benzoselenazole nucleus.

7. A photographic silver halide emulsion in accordance with claim 4 wherein said dye is selected from the group consisting of 3 - ethyl - 2 - ξ{7-[(3-ethylbenzothiazolinylidene)methyl]-3,4,4a,5,6,7 - hexahydronaphthalen - 2 - ylidene}methylξbenzothiazolin salt and 3-ethyl-2-ξ{7-[(3-ethylbenzoselenazolinylidene)methyl] - 3,4,4a,5,6,7-hexahydronaphthalen - 2 - ylidene}methylξbenzoselenazolium salt.

8. A photographic element comprising a support having thereon at least one layer containing a photographic silver halide emulsion of claim 1.

9. A photographic element comprising a support having thereon at least one layer containing a photographic silver halide emulsion of claim 4.

References Cited
UNITED STATES PATENTS
2,734,900   2/1956   Heseltine _____ 96—106

FOREIGN PATENTS
526,893   9/1940   Great Britain _____ 96—106

J. TRAVIS BROWN, Primary Examiner

U.S. Cl. X.R.

260—240